United States Patent
Venkataramani et al.

(10) Patent No.: US 7,900,438 B2
(45) Date of Patent: Mar. 8, 2011

(54) HEAT TRANSFER SYSTEM AND METHOD FOR TURBINE ENGINE USING HEAT PIPES

(75) Inventors: Kattalaicheri Srinivasan Venkataramani, West Chester, OH (US); Thomas Ory Moniz, Loveland, OH (US); Justin P. Stephenson, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1520 days.

(21) Appl. No.: 11/460,898

(22) Filed: Jul. 28, 2006

(65) Prior Publication Data

US 2010/0236215 A1 Sep. 23, 2010

(51) Int. Cl.
*F02K 99/00* (2009.01)
*F02C 7/00* (2006.01)
*F02G 3/00* (2006.01)
*B64D 15/02* (2006.01)

(52) U.S. Cl. ........ 60/267; 60/779; 60/39.093; 244/134 B

(58) Field of Classification Search ............... 60/39.093, 60/779, 39.83, 39.08, 806; 244/134 R, 134 B; 165/104.26; 415/176, 178, 114, 108
See application file for complete search history.

(56) References Cited

U.S. PATENT DOCUMENTS

| | | | |
|---|---|---|---|
| 3,965,681 A | 6/1976 | Wyczalek et al. | |
| 4,186,559 A | 2/1980 | Decker et al. | |
| 4,199,300 A | 4/1980 | Tubbs | |
| 4,207,027 A | 6/1980 | Barry et al. | |
| 4,218,179 A | 8/1980 | Barry et al. | |
| 4,240,257 A | 12/1980 | Rakowsky et al. | |
| 4,419,044 A | 12/1983 | Barry et al. | |
| 4,671,348 A * | 6/1987 | Bauer | 165/41 |
| 4,921,041 A * | 5/1990 | Akachi | 165/104.29 |
| 5,046,920 A | 9/1991 | Higashi et al. | |
| 5,178,514 A | 1/1993 | Damiral | |
| 5,192,186 A | 3/1993 | Sadler | |
| 5,439,351 A | 8/1995 | Artt | |
| 5,878,808 A | 3/1999 | Rock et al. | |
| 5,964,279 A | 10/1999 | Mochizuki et al. | |
| 5,975,841 A | 11/1999 | Lindemuth et al. | |
| 5,979,220 A | 11/1999 | Zombo et al. | |
| 6,308,524 B1 | 10/2001 | Mochizuki et al. | |
| 6,990,797 B2 | 1/2006 | Venkataramani et al. | |
| 7,131,612 B2 * | 11/2006 | Baptist et al. | 244/134 R |
| 2002/0174540 A1 * | 11/2002 | Milburn | 29/889.7 |
| 2005/0050877 A1 * | 3/2005 | Venkataramani et al. | 60/39.093 |

FOREIGN PATENT DOCUMENTS

| | | | |
|---|---|---|---|
| GB | 2047811 | * | 7/1979 |
| GB | 2136880 A | | 9/1984 |

* cited by examiner

*Primary Examiner* — William H Rodríguez
*Assistant Examiner* — Gerald L Sung
(74) *Attorney, Agent, or Firm* — Adams Intellectual Property Law; David L. Narciso, Esq.

(57) ABSTRACT

A heat transfer system is provided for a turbine engine of the type including an annular casing with an array of generally radially-extending strut members disposed therein. The heat transfer system includes at least one primary heat pipe disposed at least partially inside a selected one of the strut members; at least one secondary heat pipe disposed outside the fan casing and thermally coupled to the at least one primary heat pipe and to a heat source. Heat from the heat source can be transferred through the secondary heat pipe to the primary heat pipe and to the selected strut member.

30 Claims, 5 Drawing Sheets

HEAT TRANSFER SYSTEM AND METHOD FOR TURBINE ENGINE USING HEAT PIPES

BACKGROUND OF THE INVENTION

This invention relates generally to turbine engines, and more particularly to a system and method using heat pipes for transferring heat within a gas turbine engine.

Gas turbine engines use pressurized oil to lubricate and cool various components (e.g. bearings, etc.). The oil picks up significant heat in the process which must be rejected to maintain the oil temperature within acceptable limits. Prior art gas turbine engines often employ heat exchangers to cool the engine oil using a relatively cool air stream such as fan discharge air. In turbofan engines, this heat exchanger is often located in the fan duct flow path. This configuration results in a pressure loss and hence a significant fuel burn penalty. It has been estimated that the specific fuel consumption (SFC) penalty associated with this type of configuration can be as high as 1%. There are also cost and weight penalties associated with this configuration.

In addition, in some engines, outlet guide vanes (OGVs), fan struts, or other strut-like members in the fan duct downstream of the fan accrete ice under certain environmental conditions. Ice accumulation within the engine and over exposed engine structures may be significant. The accreted ice may lead to partial blocking of the OGV passages and fan instability. The accumulated ice can also be suddenly shed, for example through continued operation of the engine, a throttle burst from lower power operation to higher power operation, or vibrations due to either turbulence or asymmetry of ice accretion.

Various prior art methods exist for anti-icing, for example, running the engine with an increased operating temperature, directing high temperature bleed air from the engine compressor to the exposed surfaces, spraying the engine with a deicing solution prior to operation, and electric resistance heating. However, all of these methods have various disadvantages. The increased operating temperature and the bleed systems may decrease engine performance. Such systems may also require valves to turn off the flow of the high temperature air during take-off and other high power operations to protect the engine. Deicing fluid provides protection for only a limited time. Electrical heating requires large quantities of electricity for performing the de-icing operation and may require additional electrical generators, electrical circuits and complex interaction logic with the airplane's computers with the attendant increased cost, weight and performance penalties.

BRIEF SUMMARY OF THE INVENTION

The above-mentioned shortcomings in the prior art are addressed by the present invention, which provides a heat transfer system that removes waste heat from the engine lubrication oil and transfers that heat to engine components that require heating, for example for anti-icing or de-icing purposes. This heat is transferred using heat pipes which are lightweight, sealed, and passive, requiring no valves or pumps. Furthermore, the heat pipes may use a working fluid which is non-flammable to avoid creating a fire hazard within the engine.

According to one aspect, the invention provides a heat transfer system for a turbine engine of the type including an annular casing with an array of generally radially-extending strut members disposed therein. The heat transfer system includes: at least one primary heat pipe disposed at least partially inside a selected one of the strut members; and at least one secondary heat pipe disposed outside the fan casing and thermally coupled to the at least one primary heat pipe and to a heat source, such that heat from the heat source can be transferred through the secondary heat pipe to the primary heat pipe and to the selected strut member.

According to another aspect of the invention, a gas turbine engine includes: an annular fan casing; an array of generally radially-extending guide vanes disposed therein, each guide vane having an airfoil cross-section defined by first and second sides extending between spaced-apart leading and trailing edges; a plurality of primary heat pipes, each primary heat pipe being disposed at least partially inside one of the guide vanes, so as to define a first array of primary heat pipes; and a secondary heat pipe disposed outside the fan casing and thermally coupled to the first array of primary heat pipes and to a heat source, such that heat from the heat source can be transferred through the secondary heat pipe to the primary heat pipes and to the guide vanes.

According to another aspect of the invention, a method is provided for transferring heat in a turbine engine having an annular casing with an array of generally radially-extending guide vanes disposed therein. The method includes: providing a plurality of primary heat pipes, each primary heat pipe being disposed at least partially inside one of the guide vanes; providing a secondary heat pipe disposed outside the fan casing and thermally coupled to the first array of primary heat pipes and to a heat source; receiving heat from the heat source in the secondary heat pipes and transferring the heat to the primary heat pipes; and receiving heat from the secondary heat pipes in the primary heat pipes and transferring the heat to the guide vanes.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
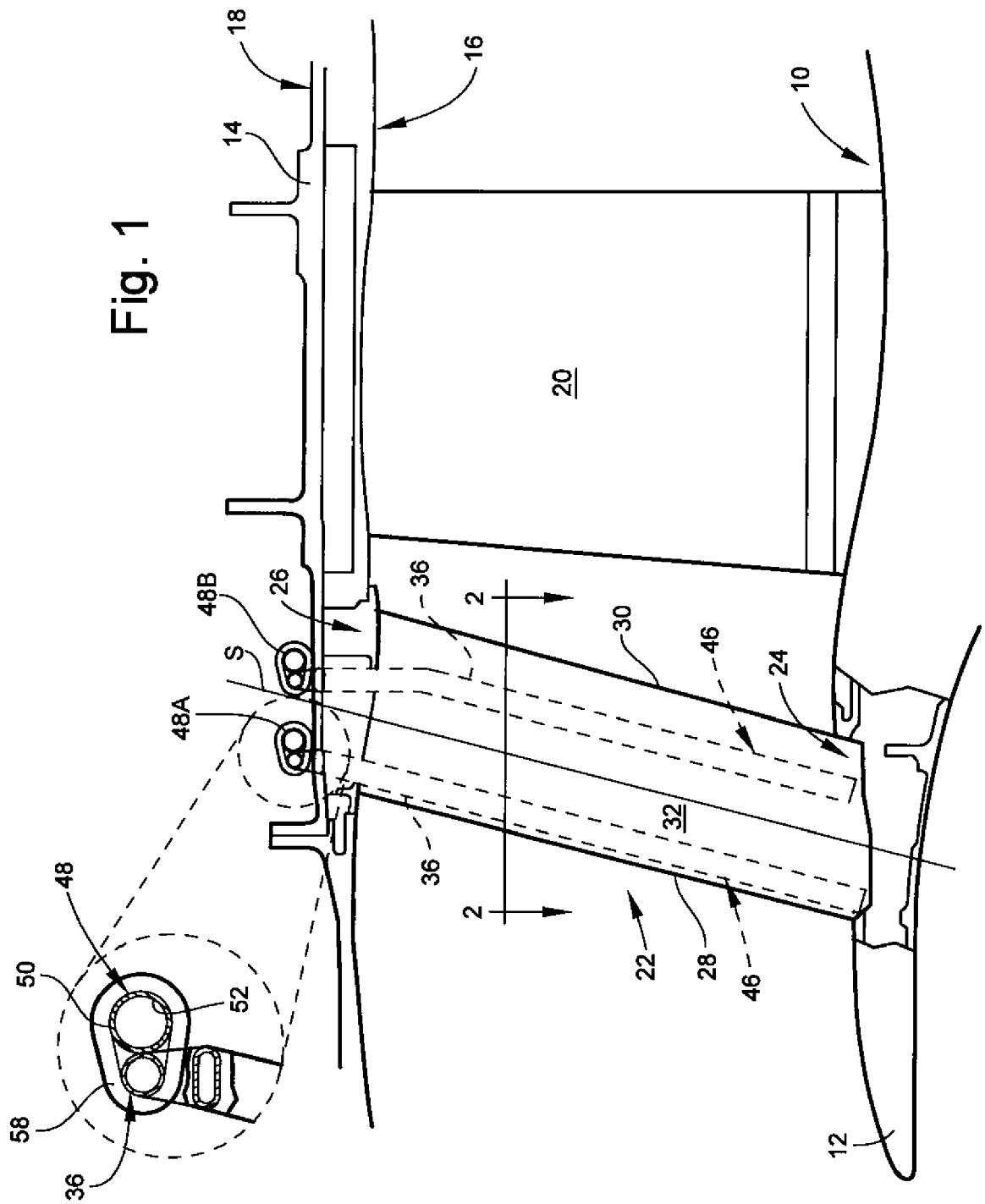
FIG. 1 is a side cross-sectional view of a fan section of a gas turbine engine including a heat transfer system constructed in accordance with an aspect of the present invention.

Referring to the drawings wherein identical reference numerals denote the same elements throughout the various views, FIG. 1 illustrates a portion of a fan section of a gas turbine engine, including an inner housing 10 with a forward-facing splitter 12, and an annular fan casing 14 with inner and outer surfaces 16 and 18, which is connected to the inner housing 10 by an array of radially extending fan struts 20. A plurality of outlet guide vanes (OGVs) 22 extend between the inner housing 10 and the fan casing 14. Each of the OGVs 22 (also shown in FIG. 2) has a root 24, a tip 26, a leading edge 28, a trailing edge 30, and opposed sides 32 and 34. The OGVs 22 are airfoil-shaped and are positioned and oriented to remove a tangential swirl component from the air flow exiting an upstream fan (not shown). In the illustrated example, the fan struts 20 and the OGVs 22, both of which are "strut members" extending in a generally radial direction, have different functions, the fan struts 20 providing structural support while the OGVs 22 serve an aerodynamic purpose. However, in other engine configurations, these functions may be combined in a single row of generally radially-extending strut members.

The OGVs 22 may be constructed from any material which has adequate strength to withstand the expected operating loads and which can be formed in the desired shape. In the illustrated example, the OGVs 22 are formed from a nonmetallic composite material including a matrix with reinforcing fibers disposed therein, such as glass-reinforced plastic, carbon-carbon, or carbon-epoxy. These materials are strong and lightweight, but have a relatively low thermal conductivity as compared to metal alloys. Metals could also be used for the OGVs 22. Examples of suitable metals include aluminum-, iron-, nickel- or titanium-based alloys.

Figure 2:
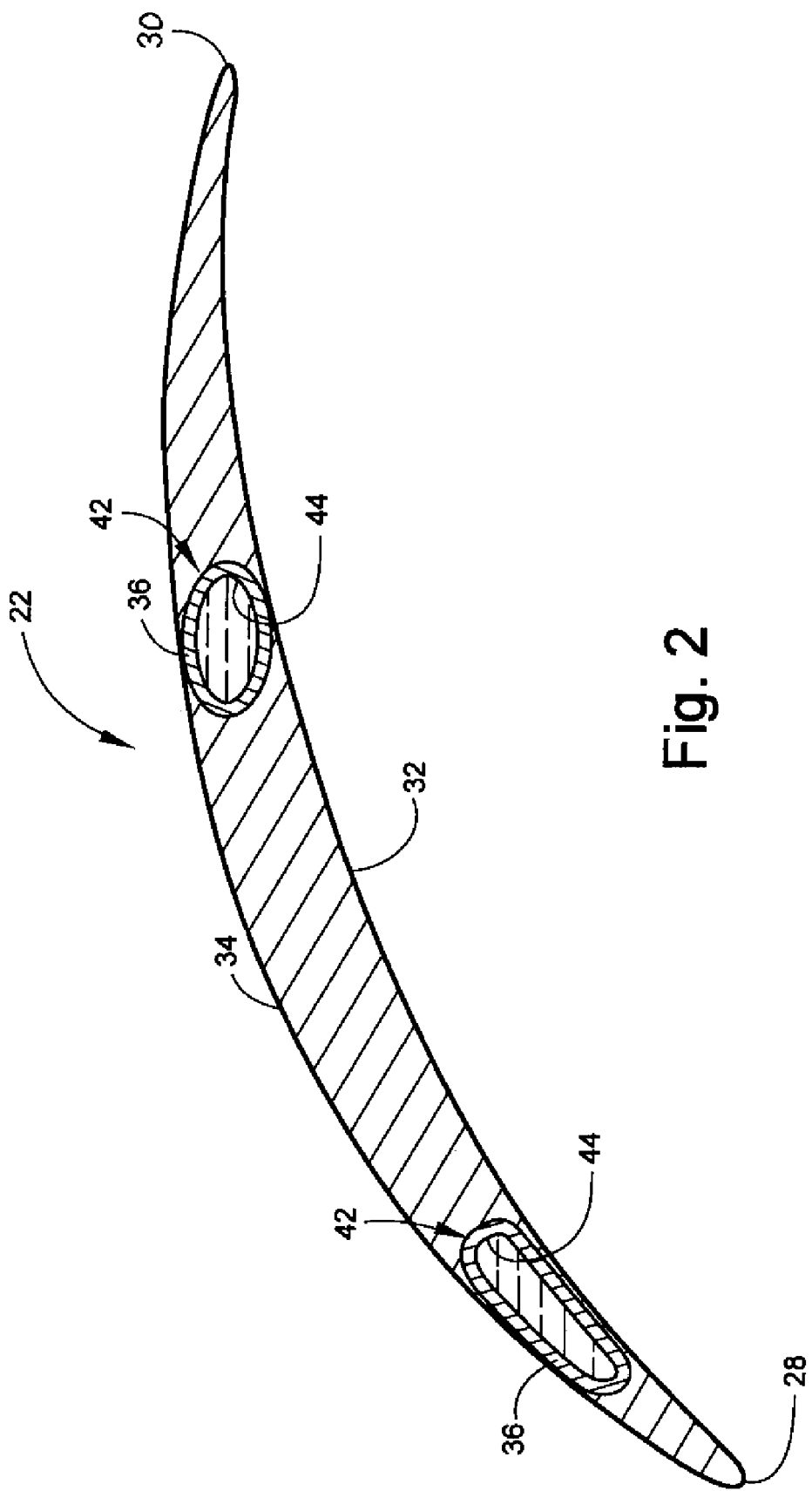
FIG. 2 is a view of an outlet guide vane taken along lines 2-2 of FIG. 1.
Figure 3:
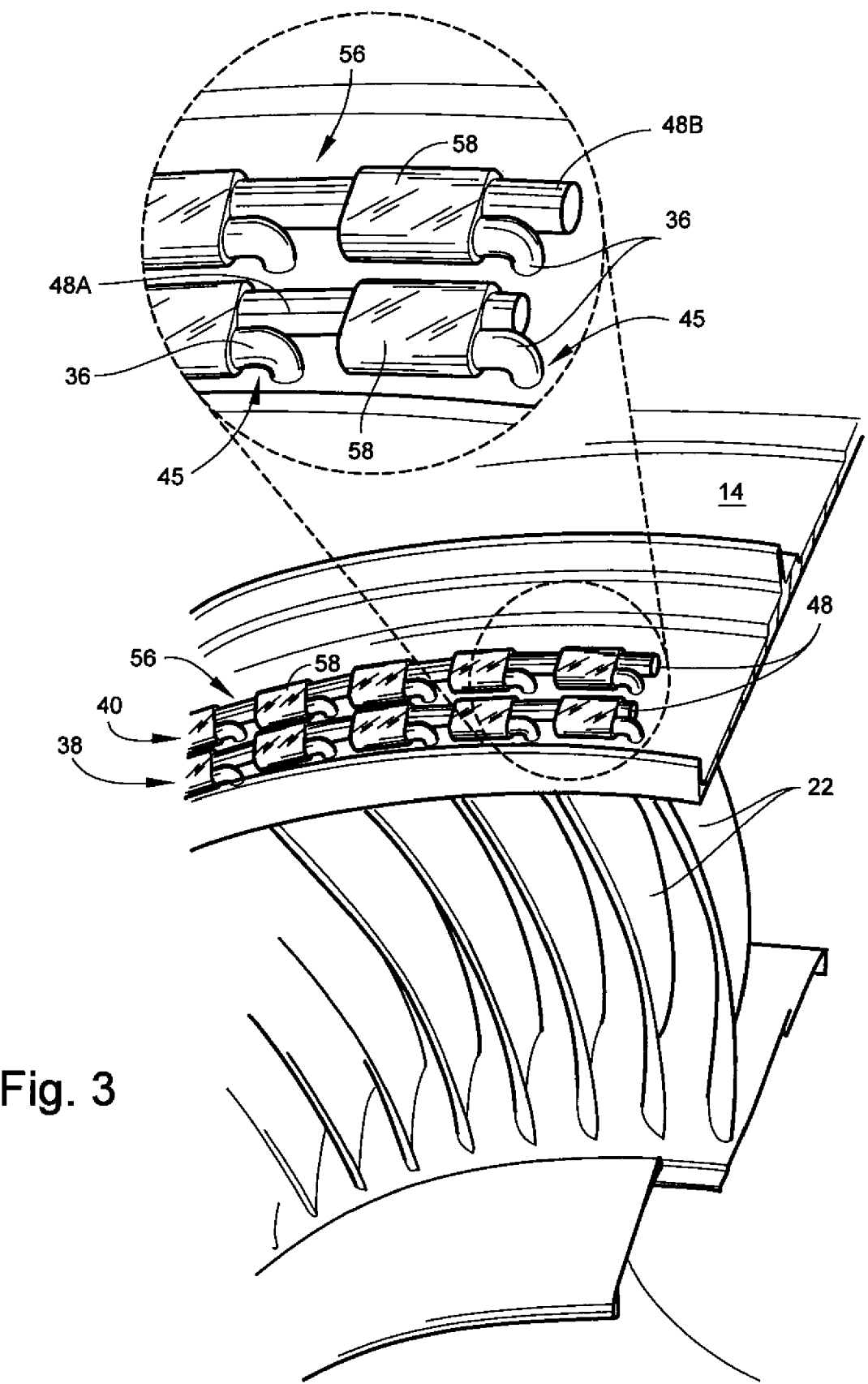
FIG. 3 is a schematic perspective view of a portion of the fan section of FIG. 1.

Primary heat pipes 36 are disposed inside one or more of the OGVs 22. In the illustrated example, a primary heat pipe 36 is placed within the cross-section of the individual OGV 22 near the leading edge 28 and extends parallel to the leading edge 28. These forward-placed primary heat pipes 36 collectively form a forward array 38 of primary heat pipes 36 (see FIG. 3). Another primary heat pipe 36 is also placed within the cross-section of the OGV 22 in the rear half of the OGV 22, closer to the trailing edge 30, and extends parallel to the stacking axis "S" (which in this case is swept rearward from a radial direction). These aft-placed primary heat pipes 36 collectively form an aft array 40 of primary heat pipes 36. As shown in FIG. 2, the portion of the primary heat pipes 36 that lie within the OGV 22 may be formed into an oval, flatted, or other non-circular cross-sectional shape to accommodate a desired cross-sectional area while fitting within the thickness of the OGV 22. Although not shown, it is also possible that primary heat pipes 36 could be laid into open grooves formed in the sides 32 or 34 of the OGV 22, in which case the primary heat pipes 36 would form a part of the surface of the sides 32 or 34, respectively. It is also possible that primary heat pipes 36 could be placed within the fan struts 20 if desired.

Each primary heat pipe 36 has an elongated outer wall 42 with closed ends which defines a cavity 44. A portion at or near the end of each primary heat pipe 36 that protrudes through the fan casing 14 is designated as the "hot" or "evaporator" portion 45 (see FIG. 3). The portion of the primary heat pipe 36 which is placed within the OGV 22 is designated as a "cold" or "condenser" portion 46 (See FIG. 1). The cavity 44 is lined with a capillary structure or wick (not shown) and holds a working fluid. Various working fluids, such as gases, water, organic substances, and low-melting point metals are known for use in heat pipes. The working fluid may be non-flammable so as to avoid introducing a fire hazard into the area of the fan casing 14.

The primary heat pipes 36 are highly efficient at transferring heat. For example, their effective thermal conductivity is several orders of magnitude higher than that of solid copper. The number, length, diameter, shape, working fluid, capillary structure, and other performance parameters of the primary heat pipes 36 are selected based on the desired degree of heat transfer during engine operation. The operation of the primary heat pipes 36 are described in more detail below.

One or more secondary heat pipes 48 are disposed around the exterior of the fan casing 14 adjacent the primary heat pipes 36. In the illustrated example, a first pair of secondary heat pipes 48A is provided. Each secondary heat pipe 48A forms nearly a 180 degree arc around the fan casing 14 adjacent the outer, hot portions 45 of the forward array 38 of primary heat pipes 36. Another pair of secondary heat pipes 4813 is also provided. Each secondary heat pipe 48B forms nearly a 180 degree arc around the fan casing 14 adjacent the outer, hot portions 45 of the aft array 40 of primary heat pipes 36. It is also possible that the secondary heat pipes 48A and 48B could be comprised of multiple arc segments each surrounding a portion of the fan casing 14 (e.g. 8, 12, or 16 segments used to cover the complete circumference of the fan casing 14). By selectively insulating portions of these arc segments, the circumferential heat distribution can be equalized as desired.

The secondary heat pipes 48 are similar in general construction to the primary heat pipes 36. As shown in FIG. 1, each secondary heat pipe 48 has an elongated outer wall 50 with closed ends which defines a cavity 52. One portion near a terminal end of each secondary heat pipe 48 is designated as the "hot" or "evaporator" portion 54, while other portions are designated as a "cold" or "condenser" end or portion 56. It should be noted that terms "hot", "evaporator", "cold", and "condenser", when used in relation to the primary and secondary heat pipes 36 and 48, describe the positioning of the heat pipes in areas of relatively high or low temperature, and are not related to any particular aspect of the structure of the heat pipes themselves. The cavity 52 is lined with a capillary structure or wick (not shown) and contains a working fluid. Various working fluids, such as gases, water, organic substances, and low-melting point methods are known for use in heat pipes. The working fluid may be non-flammable so as to avoid introducing a fire hazard into the area of the fan casing 14.

The secondary heat pipes 48 are also highly efficient at transferring heat. For example, their effective thermal conductivity is several orders of magnitude higher than that of solid copper. The number, length, diameter, shape, working fluid, and other performance parameters of the secondary heat pipes 48 are selected based on the desired degree of heat transfer during engine operation. The operation of the secondary heat pipes 48 are described in more detail below.

At each location where a primary heat pipe 36 meets a secondary heat pipe 48, the primary heat pipe 36 extends in a tangential direction, and the two are joined together using couplers 58. The couplers 58 are made of a material with relatively high thermal conductivity, such as a metal alloy, and are assembled, bonded, molded, or otherwise formed around the primary and secondary heat pipes 36 and 48. In the example shown in FIG. 1, the primary and secondary heat pipes 36 and 48 are of a circular cross-section and contact each other essentially along a line parallel to the length of the coupler 58 in the tangential direction.

Figure 4:
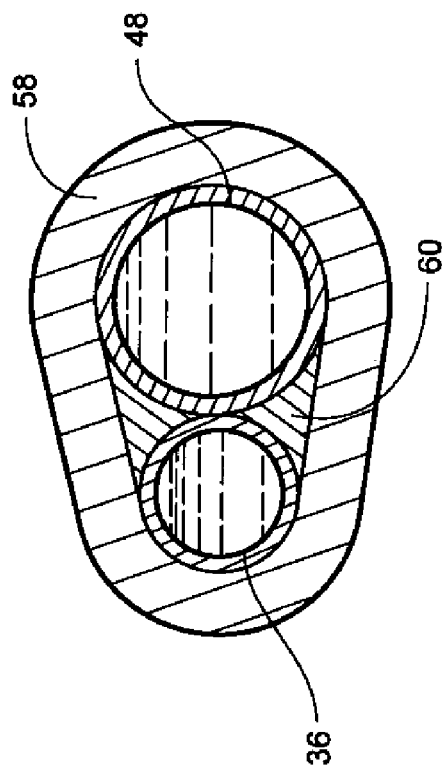
FIG. 4 is a cross-sectional view of a pair of heat pipes connected in an alternative configuration of a coupler.

The joints between the primary and secondary heat pipes 48 may be formed in a number of ways to increase the efficiency of heat transfer. For example, FIG. 4 depicts a possible configuration in which a filler 60 is disposed inside the coupler 58 in the voids between the two heat pipes. Any material with relatively high thermal conductivity may be used, such as metals, conductive pastes, or plastics. The use of the filler 60 effectively increases the surface area contact between the primary and secondary heat pipes 36 and 48 and thus improves heat transfer.

Figure 5:
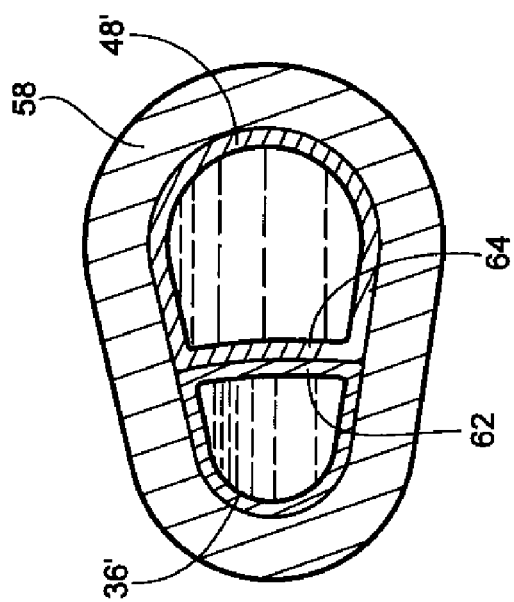
FIG. 5 is a cross-sectional view of a pair of heat pipes connected in another alternative configuration of a coupler.

FIG. 5 depicts another possible configuration using modified primary and secondary heat pipes 36' and 48'. At least the portions of the primary and secondary heat pipes 36 and 48 that are contained within the coupler 58 are formed in into complementary non-circular shapes, so that the primary and secondary heat pipes 36 and 48 have abutting walls 62 and 64 with substantial conforming contact to enhance heat transfer.

Figure 6:
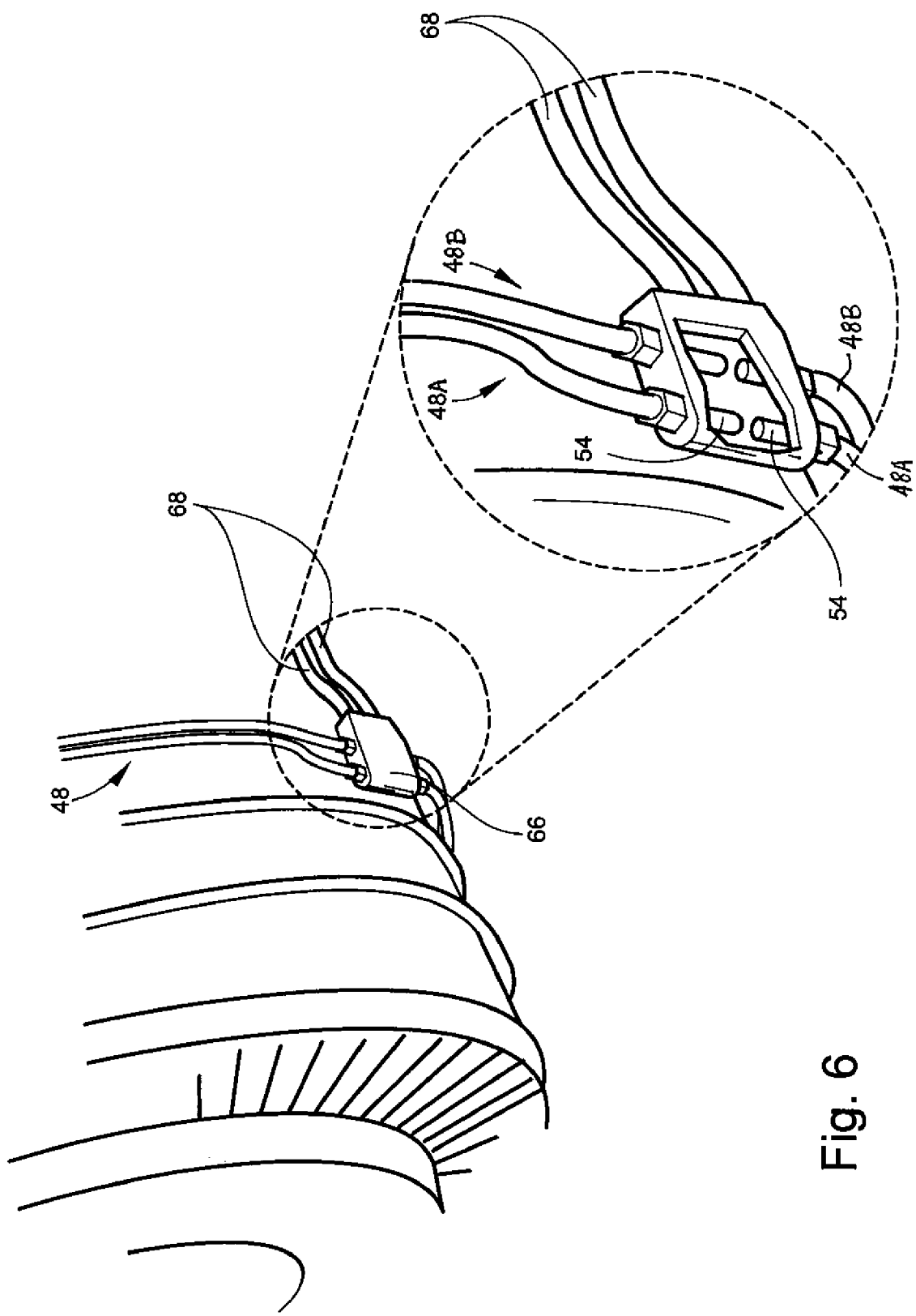
FIG. 6 is schematic perspective view of a portion of the fan section of FIG. 1, showing the connection of heat pipes to a heat exchanger.

As shown in FIG. 6, The evaporator portions or ends 54 of the secondary heat pipes 48 are disposed inside a heat exchanger 66. The heat exchanger 66 is simply a housing with an open interior through which engine oil is circulated via oil conduits 68. The remainder of the oil storage, circulation, and distribution system connected to the oil conduits 68 is conventional within the gas turbine engine art, and not discussed here.

Thermal insulation, which is not illustrated for clarity, may be provided within the anti-icing and oil cooling system wherever it is desired to prevent heat loss. For example, insulation may be placed around the exterior of the heat exchanger 66, the exterior of the secondary heat pipes 48, and exposed portions of the primary heat pipes 36 and the couplers 58.

In operation, oil which has absorbed heat from various parts of the engine is circulated into the heat exchanger 66 where it heats the hot or evaporator portions 54 of the secondary heat pipes 48. The heat removal cools the oil to an acceptable working temperature so that it can be re-circulated through the engine. The working fluid within the secondary heat pipe 48 absorbs that heat and evaporates. The vapor generated then travels through the cavity 52, and condenses at the cold portions 56 of the secondary heat pipes 48, thereby transferring heat to the cold portions 56 inside the couplers 58. A wick that extends from one end of the secondary heat pipe 48 to the other transports the condensed liquid back to the hot portion 54 by capillary action, thereby completing the circuit. The heat from the cold portions 56 of the secondary heat pipes 48 is transferred to the hot portions 45 of the primary heat pipes 36.

The working fluid inside the primary heat pipes 36 absorbs that heat and evaporates. The vapor generated then travels through the cavities 44, and condenses at the cold portions 46 of the primary heat pipes 36, thereby transferring heat to the OGVs 22. Wicks or other capillary structures that extend within the primary heat pipes 36 to the other transport the condensed liquid back to the hot portions 45 by capillary action, thereby completing the circuit. The heat transfer to the OGVs 22 is effective to prevent ice formation (i.e. anti-icing) and/or remove ice which has formed on the OGVs 22 (i.e. de-icing), depending on the heating rate. If necessary, the characteristics of the primary heat pipes 36 may be varied to accommodate their individual orientation. For example, a horizontal primary heat pipe 36, or a vertical primary heat pipe 36 in which the hot portion 45 is at the top, may require a design providing stronger capillary action to ensure adequate condensate return, than a vertical primary heat pipe 36 with its hot portion 45 at the bottom.

The heat transfer system described herein, being passive, needs no valves and is sealed. The number, size, and location of the primary and secondary heat pipes 36 and 48 can be selected to provide heat removal and transfer as needed. Depending upon the exact configuration chosen, the system performance may be used only for anti-icing or de-icing, or for only for oil cooling, or for both purposes. The heat transfer system makes use of heat which is undesired in one portion of an engine and uses that heat where it is needed in another portion of the engine, avoiding both the losses associated with prior art cooling systems and the need for a separate anti-icing heat source.

While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A heat transfer system for a turbine engine including an annular casing with an array of generally radially-extending strut members disposed therein, the heat transfer system comprising:
    at least one primary heat pipe having an elongated outer wall and closed ends defining a sealed first cavity containing a first fluid, the primary heat pipe disposed at least partially inside a selected one of the strut members; and
    at least one secondary heat pipe having an elongated outer wall and closed ends defining a second cavity that is sealed independently of the first cavity and that contains a second fluid, the secondary heat pipe disposed outside the annular casing and thermally coupled to the at least one primary heat pipe and to a heat source, such that heat from the heat source can be transferred through the secondary heat pipe to the primary heat pipe and to the selected strut member without any of the first fluid being transferred from the primary heat pipe and without any of the second fluid being transferred from the secondary heat pipe.

2. The heat transfer system of claim 1 wherein:
    the selected strut member is a guide vane having an airfoil cross-section defined by first and second sides extending between spaced-apart leading and trailing edges; and
    the primary heat pipe is contained within the airfoil cross-section.

3. The heat transfer system of claim 1 wherein:
    the selected strut member is a guide vane having an airfoil cross-section defined by first and second sides extending between spaced-apart leading and trailing edges; and
    at least a portion of a selected one of the first and second sides is defined by an exposed portion of the primary heat pipe.

4. The heat transfer system of claim 1 wherein the selected strut member comprises a nonmetallic material.

5. The heat transfer system of claim 1 wherein the selected strut member is constructed of a nonmetallic composite material including a matrix with reinforcing fibers disposed therein.

6. The heat transfer system of claim 1 wherein the primary and secondary heat pipes are thermally coupled to each other by a coupler of thermally conductive material which surrounds at least a portion of the primary and secondary heat pipes.

7. The heat transfer system of claim 6 wherein the primary and secondary heat pipes are maintained in physical contact with each other by the coupler.

8. The heat transfer system of claim 1 wherein selected ends of the secondary heat pipes are disposed inside a hollow interior of a heat exchanger adapted to receive a flow of heated fluid therethrough.

9. The heat transfer system of claim 1 wherein the primary and secondary heat pipes are thermally coupled to each other by a coupler, wherein a space is defined within the coupler and between the primary and secondary heat pipes, and wherein the space is occupied by a filler of a thermally conductive material.

10. The heat transfer system of claim 1 wherein portions of the primary and secondary heat pipes within the coupler have mutually complementary, non-circular shapes and are disposed in substantial conforming contact with each other.

11. The heat transfer system of claim 1 wherein:
a first primary heat pipe is disposed at least partially inside the selected strut member near a forward end thereof; and
a second primary heat pipe is disposed at least partially inside the selected strut member aft of the first primary heat pipe.

12. The heat transfer system of claim 1 wherein:
a plurality of the strut member each have at least one primary heat pipe disposed at least partially therein; and
a secondary heat pipe extends around the perimeter of the fan casing and is coupled to each of the primary heat pipes.

13. The heat transfer system of claim 1 wherein the heat transfer system facilitates at least one of preventing ice formation on the selected strut member and removing ice which has formed on the strut member.

14. The heat transfer system of claim 1 wherein the heat source is engine oil from the turbine engine, and the heat transfer system facilitates maintaining the engine oil at an acceptable working temperature.

15. A gas turbine engine including:
an annular fan casing;
an array of generally radially-extending guide vanes disposed therein, each guide vane having an airfoil cross-section defined by first and second sides extending between spaced-apart leading and trailing edges;
a plurality of primary heat pipes, each primary heat pipe having an elongated outer wall and closed ends defining an independently sealed cavity containing a first fluid, each primary heat pipe being disposed at least partially inside one of the guide vanes, so as to define a first array of primary heat pipes; and
a secondary heat pipe having an elongated outer wall and closed ends defining an independently sealed cavity containing a second fluid, the secondary heat pipe being disposed outside the fan casing and thermally coupled to the first array of primary heat pipes and to a heat source, such that heat from the heat source can be transferred through the secondary heat pipe to the primary heat pipes and to the guide vanes without any of the first fluid being transferred from any one primary heat pipe and without any of the second fluid being transferred from the secondary heat pipe.

16. The gas turbine engine of claim 15 wherein the primary heat pipes are contained within the airfoil cross-section of the respective guide vanes.

17. The gas turbine engine of claim 15 wherein at portions of one or both of the first and second sides of the guide vanes are defined by exposed portions of the respectively primary heat pipes.

18. The gas turbine engine of claim 15 wherein the guide vanes comprise a nonmetallic material.

19. The gas turbine engine of claim 15 wherein the guide vanes are constructed of a nonmetallic composite material including a matrix with reinforcing fibers disposed therein.

20. The gas turbine engine of claim 15 wherein the primary and secondary heat pipes are thermally coupled to each other by a coupler of thermally conductive material which surrounds at least a portion of the primary and secondary heat pipes.

21. The gas turbine engine of claim 20 wherein the primary and secondary heat pipes are maintained in physical contact with each other by the coupler.

22. The gas turbine engine of claim 15 wherein selected ends of the secondary heat pipes are disposed inside a hollow interior of a heat exchanger adapted to receive a flow of heated fluid therethrough.

23. The gas turbine engine of claim 15 wherein a space defined within the coupler and between the primary and secondary heat pipes is occupied by a filler of a thermally conductive material.

24. The gas turbine engine of claim 15 wherein portions of the primary and secondary heat pipes within the coupler have mutually complementary, non-circular shapes and are disposed in substantial conforming contact with each other.

25. The gas turbine engine of claim 15 further including additional primary heat pipes disposed at least partially inside the guide vanes aft of the first array of primary heat pipes, so as to define a second array of primary heat pipes.

26. The gas turbine engine of claim 15 wherein the heat transfer system facilitates at least one of preventing ice formation on the selected guide vanes and removing ice which has formed on the guide vanes.

27. The gas turbine engine of claim 15 wherein the heat source is engine oil from the turbine engine, and the heat transfer system facilitates maintaining the engine oil at an acceptable working temperature.

28. A method for transferring heat in a turbine engine having an annular casing with an array of generally radially-extending guide vanes disposed therein, said method comprising: providing a plurality of primary heat pipes each having an elongated outer wall and closed ends defining a sealed first cavity containing a first fluid, each primary heat pipe being disposed at least partially inside one of the guide vanes; providing a secondary heat pipe having an elongated outer wall and closed ends defining a second cavity that is sealed independently of the first cavity and that contains a second fluid, the secondary heat pipe disposed outside the fan casing and thermally coupled to the first array of primary heat pipes and to a heat source such that heat from the heat source can be transferred through the secondary heat pipe to the primary heat pipes and to the guide vanes without any of the first fluid being transferred from the primary heat pipes and without any of the second fluid being transferred from the secondary heat pipe; receiving heat from the heat source in the secondary heat pipes and transferring the heat to the primary heat pipes; and receiving heat from the secondary heat pipes in the primary heat pipes and transferring the heat to the guide vanes.

29. The method of claim 28 wherein sufficient heat is transferred to the guide vanes so as to achieve at least one of preventing ice formation on the selected guide vanes and removing ice which has formed on the guide vanes.

30. The method of claim 28 wherein the heat source is engine oil from the turbine engine, and sufficient heat is removed from the engine oil to maintain the engine oil at an acceptable working temperature.

* * * * *